March 22, 1966
F. H. P. SULLY ETAL
3,241,569
SEQUENCING VALVE WITH INTEGRATED SURGE CONTROL
AND PRESSURE DROP ACTUATED
Filed Oct. 20, 1964
4 Sheets-Sheet 1
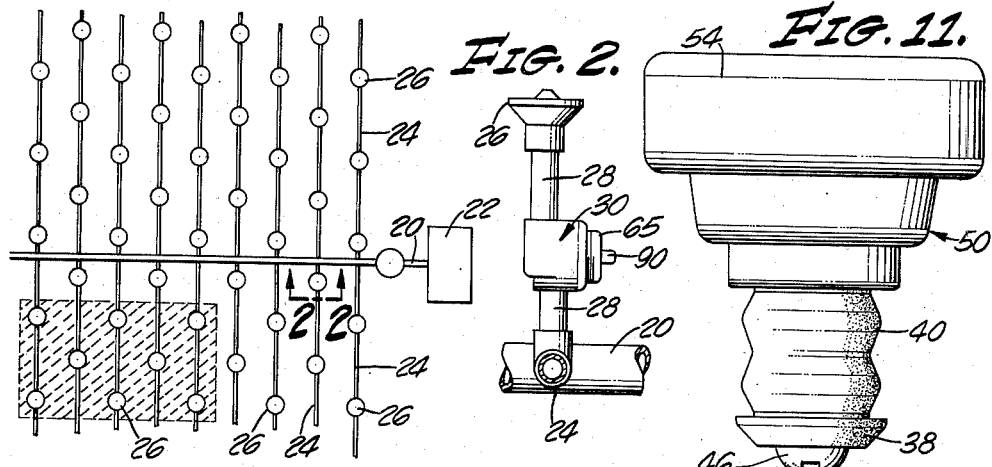
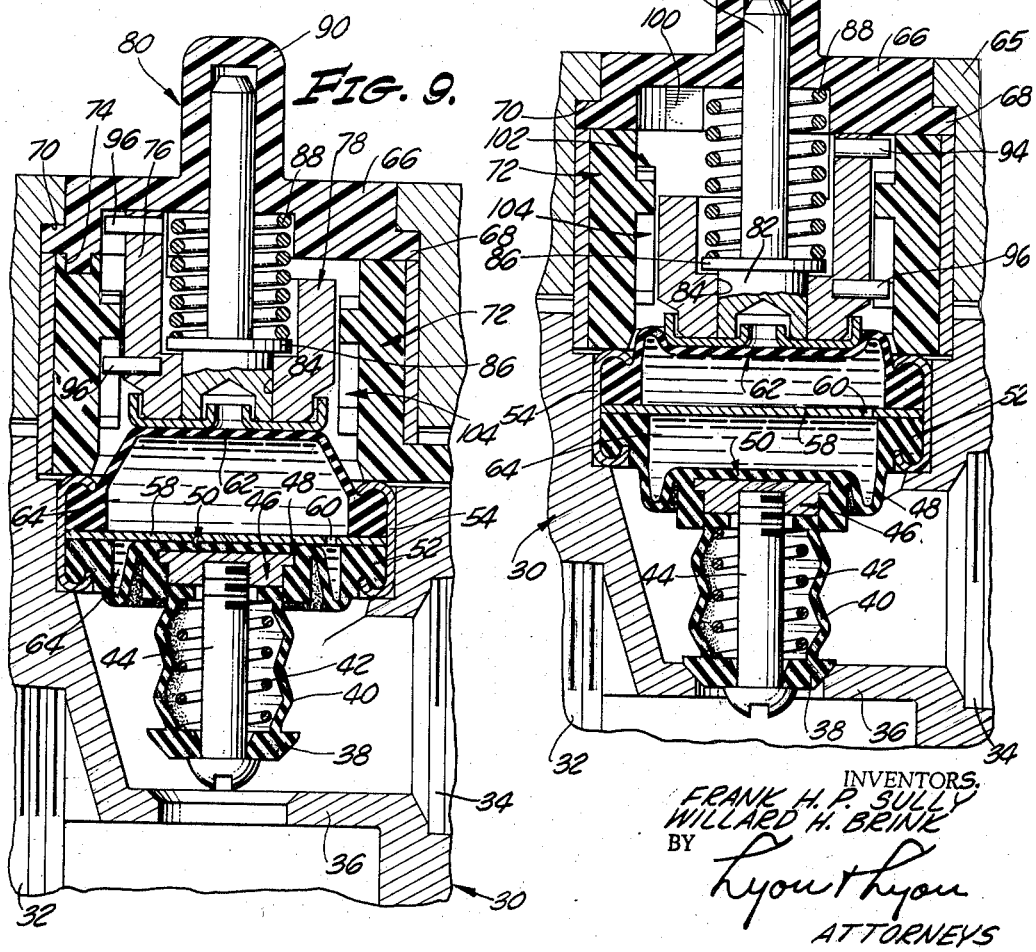
INVENTORS.
FRANK H. P. SULLY
WILLARD H. BRINK
BY
Lyon & Lyon
ATTORNEYS

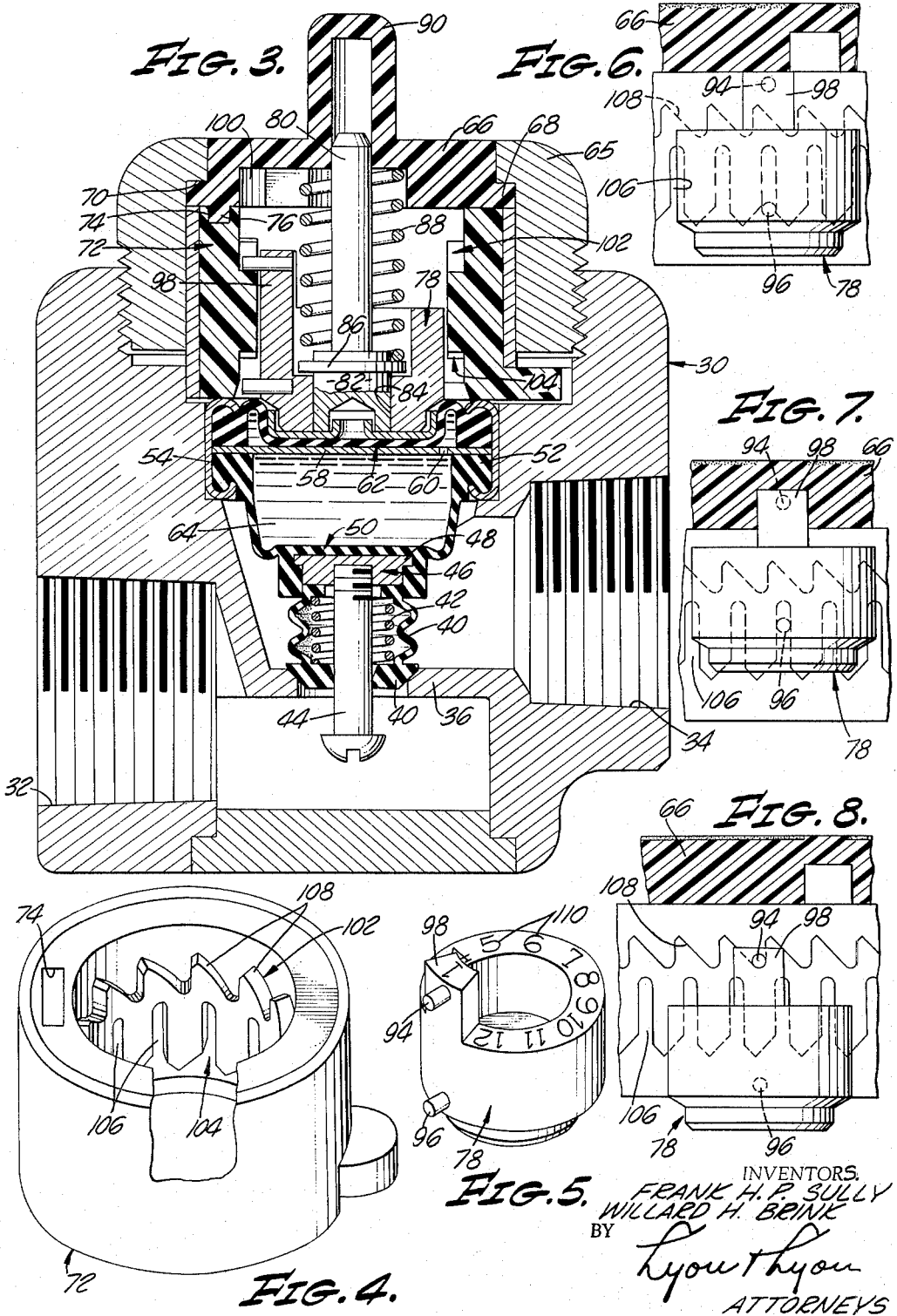

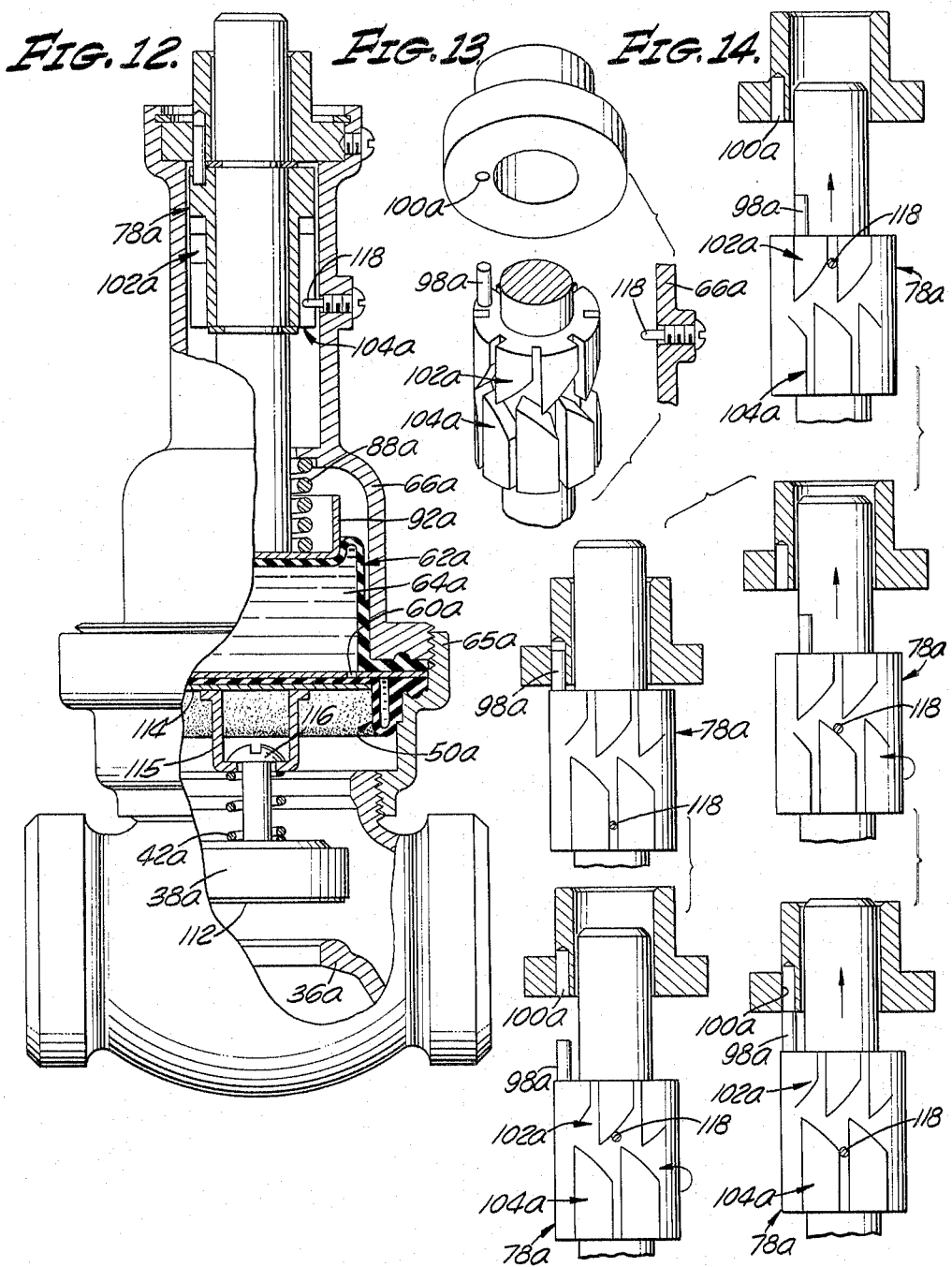

March 22, 1966  F. H. P. SULLY ETAL  3,241,569
SEQUENCING VALVE WITH INTEGRATED SURGE CONTROL
AND PRESSURE DROP ACTUATED
Filed Oct. 20, 1964  4 Sheets-Sheet 4
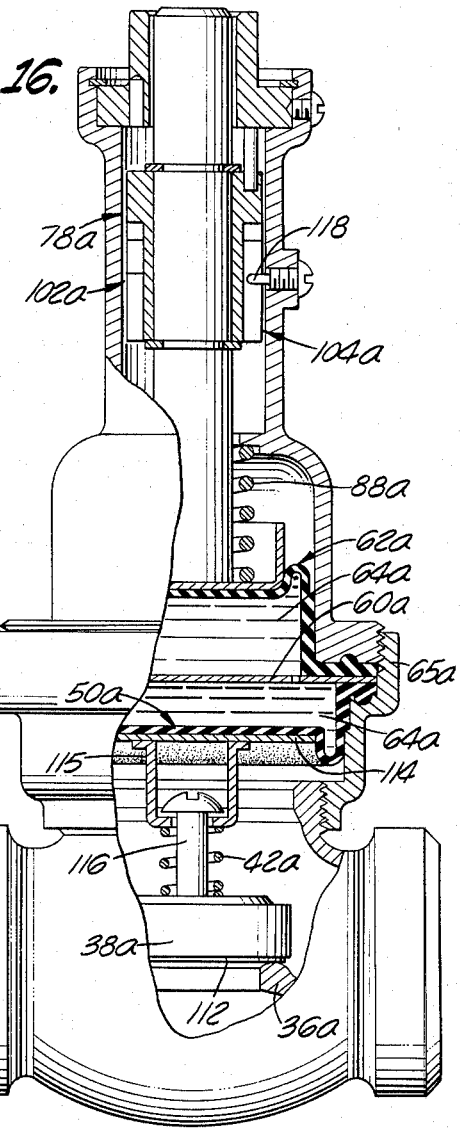
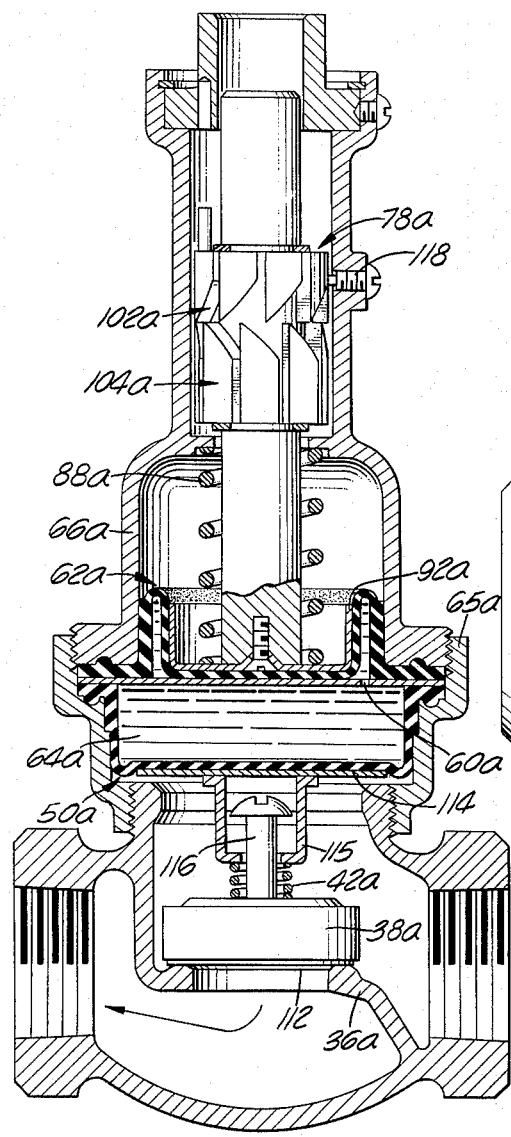
INVENTORS.
FRANK H. P. SULLY
WILLARD H. BRINK
BY
Lyon & Lyon
ATTORNEYS United States Patent Office
3,241,569
Patented Mar. 22, 1966

3,241,569
SEQUENCING VALVE WITH INTEGRATED SURGE CONTROL AND PRESSURE DROP ACTUATED
Frank H. P. Sully, La Mirada, and Willard H. Brink, La Canada, Calif., assignors to Western Brass Works, Los Angeles, Calif., a corporation of California
Filed Oct. 20, 1964, Ser. No. 405,090
6 Claims. (Cl. 137—624.13)

This invention relates to a system for controlling fluid flow and to novel valve means used therein.

This application will be directed to the use of the invention in controlling an irrigation system, although it is obviously adaptable to other uses in which flow of fluid through multiple outlets in sequence is desirable.

In the irrigation of agricultural fields a sequential system is highly desirable to cover a large area. Thus one area may be watered, then a second, and so forth until the entire field is irrigated. A system capable of such sequential operation can be used effectively to cover large areas at greatly reduced cost inasmuch as smaller pipes, pumps, engines and other equipment may be used. In a sequentially operated system only a small number of sprinklers are actuated at one time. Also, a sequentially operated system does not require a large flow of water which is of importance where a well is the source.

It is therefore an object of this invention to provide a system for sequentially delivering flow through multiple outlets.

It is a further object of this invention to provide a highly reliable system where incorrect sequencing or cycling is eliminated.

It is a further object of this invention to provide a system which will not cycle incorrectly due to water hammer or air trap.

Further it is an object of this invention to provide a sequencing system which will continue cycling even if shut down for prolonged periods instead of starting over again.

It is a further object of this invention to have the sequencing mechanisms isolated from the fluid being conveyed to reduce wear or damage thereto by the fluid or foreign substances.

Still a further object of this invention is to provide a system wherein installation, operating and maintenance costs are minimized.

Still a further object of this invention is to provide a sequencing system wherein automatic control is exercised from a remote position.

It is still a further object of this invention to provide a system for sequential irrigation of a series of areas in a preselected program which will complete the program before restarting same.

Still a further object of this invention is to provide a system wherein reduction in pressure of fluid in the system will sequence remotely positioned valves to carry out the preselected pattern of irrigation.

Still a further object of this invention is to provide a sequencing valve of relatively small size and cost to operate an overhead sprinkler-type irrigation system in a preselected program.

Still a further object of this invention is to provide such a sequencing valve which may readily be hermetically sealed and buried for extended periods.

Other objects and advantages will be readily apparent from the following description.

In the drawings:

FIGURE 1 is a schematic view of an irrigation system embodying this invention.

FIGURE 2 is a view taken along line 2—2 of FIGURE 1.

FIGURE 3 is a section taken through the sequencing valve in the fully closed position.

FIGURE 4 is a perspective with part broken away of the cam body.

FIGURE 5 is a perspective of the sequencing drum.

FIGURE 6 is a diagrammatic view illustrating sequencing of the drum.

FIGURE 7 is a view similar to FIGURE 6 further illustrating sequencing of the drum.

FIGURE 8 is a view similar to FIGURE 6 further illustrating sequencing of the drum.

FIGURE 9 is a section through the valve in the fully open position.

FIGURE 10 is a section through the valve in an intermediate position.

FIGURE 11 is a side elevation of the valve cartridge.

FIGURE 12 is a side elevation partially in section of modified form of the valve shown here in the flow position.

FIGURE 13 is an exploded perspective view of sequencing mechanism of the modification.

FIGURE 14 is a diagrammatic view of the sequencing mechanism of the modification illustrating successive positions thereof.

FIGURE 15 is a view similar to FIGURE 12 with the valve in the shut off position.

FIGURE 16 is a view similar to FIGURE 12 with the valve in the intermediate position.

Referring first to FIGURE 1, there is schematically illustrated a field to be irrigated. For example, the hatched area is to be irrigated separately from the remainder. Water flows through line 20 by means of a pump not shown which may be controlled by a timing device 22. Cross lines 24 are provided with suitable sprinkler heads 26. Positioned in the stand pipe 28 of the sprinkler head is a sequencing valve which responds to the commencing and terminating of flow through the cross line. Thus, when water flow is terminated and then started again, the sequencing valve will react and, after a predetermined number of such actions, will permit flow through the sprinkler head 26. In this manner individual sprinklers or areas may be actuated to permit any desired pattern of irrigation as may be dictated by crop or soil requirements.

The sequencing valve itself is illustrated in FIGURES 3 through 11. A valve body 30 has an inlet 34 and an outlet 32 having a valve seat 36 positioned therebetween. A valve member 38 seats against valve seat 36, shutting off flow therethrough. The valve member in this embodiment is of a resilient material and forms the extremity of a bellows 40 housing a coil spring 42 tending to expand the bellows. A screw 44 projects through the valve member 38 and screws into plate 46 which abuts the upper extremity of bellows 40. The plate has a peripheral flange 48 around which the lower portion of lower diaphragm 50 is moulded to secure the plate 46 and hence bellows 40 to said diaphragm. The lower diaphragm has an enlarged beaded periphery 52 which is retained in retaining ring 54 which is C-shaped in cross section, fitting around bead 56. Positioned above lower diaphragm 46 is a rigid plate 58 having one or more bleed ports 60 therethrough. Upper diaphragm 62 is secured in ring 54 in the same manner as the lower diaphragm. A suitable fluid 64 is provided within the diaphragms which meters through ports 60 to absorb variations in line pressure, entrapped air, water hammer and the like without sequencing the valve.

Bonnet 65 screws into valve body 30 and a cap 66 has a peripheral flange 68 abutted by shoulder 70 formed on the bonnet. An indexing cam body 72 (see FIGURE 4) has a slot 74 in the upper surface which receives tab 76 on cap 66. The lower extremity of the cam body bears on ring 54, clamping the diaphragms and valve member 38 in place.

The sequencing drum 78 (see FIGURE 5) fits within cam body 72. A pin 80 has a head 82 which fits into a central bore 84 in drum 78 and flange 86 which forms a base for spring 88 which bears against cap 66. The cap has a hollowed protuberance 90 permitting movement of pin 80. A bearing plate 92 is positioned between drum 78 and upper diaphragm 62.

The sequencing drum has a pair of spaced-apart pins 94 and 96 which engage cam ways formed in cam body 72. Also a protuberance 98 projects above sequencing drum 78 and is adapted, when in the proper position, to enter slot 100 formed in cap 66.

The cam body has an upper cam surface 102 which meshes with upper pin 94 and a lower cam surface 104 which meshes with lower pin 96. When water flow to the inlet 34 is commenced, the pressure exerted will raise the lower diaphragm 50 metering fluid through orifice 60 and forcing the upper diaphragm 62 upwardly, thereby raising drum 78 with respect to the cam body. Pin 96 will enter one of the channels 106 until protuberance 98 strikes cap 66, preventing further travel. Unless protuberance 98 enters slot 100, this amount of travel is insufficient to raise the valve 38 off valve seat 36 to permit flow through the sequencing valve (see FIGURE 10). When water flow to the inlet is terminated and hence the pressure removed, spring 88 will urge the drum to its initial position. Pin 94 will engage one of the inclined teeth 108 on the way down and rotate the drum one position. The next time the water is turned on and then off, the drum will be rotated one more step. This process is continued until protuberance 98 comes opposite slot 100. When in this position and flow is commenced, drum 78 is permitted to rise further to the position of FIGURE 9, unseating valve 38 and permitting flow. The various positions of drum 78 may be numbered as at 110 and same are visible through the transparent cap 66. It is, of course, apparent that the number of steps can be varied by altering the number and pitch of teeth 108 or varying the number of slots 100 in cap 66 to meet the particular requirements.

Turning now to the modification wherein like parts are given the same numerical designation with the addition of the exponent "a," several changes have been made.

The valve element 38a has a resilient member 112 adapted to contact valve seat 36a. A plate 114 bears against lower diaphragm 50a and carries a cap 115 within which the head of screw 116 attached to valve element 38a may move. Spring 42a urges valve 38a to seat against the valve seat 36a.

The peripheries of the upper diaphragm 62 and lower diaphragm 50a are in this embodiment clamped between valve bonnet 65a and cap 66a.

The further change resides in the sequencing arrangement wherein the pins have been combined into one pin 118 held in cap 60a and the upper and lower cams 102a and 104a are formed on the reciprocating and rotating drum 78a. The operation of the modification is essentially the same as in the previously described embodiment.

While what hereinbefore has been described as the preferred embodiment of this invention, it is readily apparent that modifications and alterations can be made without departing from the scope of the invention.

We claim:

1. A sequencing valve comprising a valve body having an inlet and an outlet, means forming a valve seat between said inlet and said outlet, a valve member adapted to control flow through said valve seat, a sequencing means permitting opening of said valve member when in a predetermined position only, a pair of flexible diaphragms, one operatively associated with said valve member, the other operatively associated with said sequencing means, a metering plate between said diaphragms, and metering fluid entrapped between said diaphragms, said one diaphragm being exposed to inlet pressure and arranged to urge said valve toward open position in response to inlet pressure whereby initial flow pressure in said inlet will be transmitted to said sequencing means and other pressure variations will be absorbed.

2. A sequencing valve as defined in claim 1 wherein said sequencing means is mounted directly above said one diaphragm for reciprocal movement against the force of a spring in response to movement of said one diaphragm.

3. A sequencing valve as defined in claim 2 wherein said sequencing means comprises a reciprocally movable sequencing drum mounted within a cam body and operatively engaged in camming relation therewith.

4. A sequencing valve as defined in claim 3 wherein indicia are provided at one end of said sequencing drum and are visible through a transparent cap disposed outwardly thereof.

5. A sequencing valve comprising a valve body having an inlet and an outlet, means forming a valve seat between said inlet and said outlet, a valve member adapted to control flow through said valve seat, a movable sequencing element, a stop element, a protuberance on one and a protuberance receiving slot in the other element, pressure-transmitting means transmitting initial flow pressure against said valve member to said sequencing member, and means moving said sequencing element in response to termination of said flow pressure through a series of steps until said protuberance indexes with and enters said slot permitting flow through said valve, said pressure-transmitting means including a pair of flexible diaphragms, one operatively associated with said valve member, the other operatively associated with said sequencing means, a metering plate between said diaphragms, and metering fluid entrapped between said diaphragms, said one diaphragm being exposed to inlet pressure and arranged to urge said valve toward open position in response to inlet pressure whereby initial flow pressure in said inlet will be transmitted to said sequencing means and other pressure variations will be absorbed.

6. A sequencing valve comprising a valve body having an inlet and an outlet, means forming a valve seat between said inlet and said outlet, a valve member adapted to control flow through said valve seat, a reciprocable and rotating sequencing element, a stop element, a protuberance on one of said elements limiting reciprocation thereof, a slot on the other element adapted to receive said protuberance, means limiting movement of said valve member to movement of said sequencing element, pressure-transmitting means transmitting initial flow pressure against said valve member to said sequencing element to move same and absorbing other pressure fluctuations, and camming means rotating said sequencing element upon termination of said flow pressure whereby said sequencing element will move through a series of positions until said protuberance enters said slot and permits flow through said valve, said pressure-transmitting means including a pair of flexible diaphragms, one operatively associated with said valve member, the other operatively associated with said sequencing means, a metering plate between said diaphragms, and metering fluid entrapped between said diaphragms, said one diaphragm being exposed to inlet pressure and arranged to urge said valve toward open position in response to inlet pressure whereby initial flow pressure in said inlet will be transmitted to said sequencing means and other pressure variations will be absorbed.

References Cited by the Examiner

UNITED STATES PATENTS

| | | | |
|---|---|---|---|
| 3,145,736 | 8/1964 | Gheen | 239—66 X |
| 3,147,770 | 9/1964 | Perlis | 239—66 X |

ISADOR WEIL, Primary Examiner.

ALAN COHAN, Examiner.